United States Patent [19]

Taira

[11] Patent Number: 5,410,560

[45] Date of Patent: Apr. 25, 1995

[54] WAVELENGTH CONVERSION APPARATUS

[75] Inventor: Yoichi Taira, Tokyo, Japan

[73] Assignee: International Business Machines Corporation, Armonk, N.Y.

[21] Appl. No.: 113,544

[22] Filed: Aug. 27, 1993

[30] Foreign Application Priority Data

Sep. 4, 1992 [JP] Japan .................................. 4-236934

[51] Int. Cl.6 .................................................. H01S 3/10
[52] U.S. Cl. ...................................... 372/21; 372/101; 372/100
[58] Field of Search ................... 372/21, 28, 106, 101, 372/92; 359/328; 385/122

[56] References Cited

U.S. PATENT DOCUMENTS

| 4,642,809 | 2/1987 | Petheram | 372/66 |
|---|---|---|---|
| 4,739,507 | 4/1988 | Payer et al. | 372/22 |
| 5,144,630 | 9/1992 | Lin | 372/22 |
| 5,173,799 | 12/1992 | Tanuma | 372/22 |
| 5,235,605 | 8/1993 | Rines et al. | 372/66 |
| 5,285,460 | 2/1994 | Ueda et al. | 372/22 |
| 5,321,718 | 6/1994 | Waarts et al. | 372/21 |

FOREIGN PATENT DOCUMENTS 0517518 4/1992 European Pat. Off. ....... G02F 1/37

Primary Examiner—Léon Scott, Jr.
Attorney, Agent, or Firm—Thomas R. Berthold

[57] ABSTRACT

A wavelength conversion apparatus using a nonlinear optical element for generating light different in wavelength from an incident fundamental wave. This apparatus utilizes a nonlinear optical element or a focusing lens element in the conversion apparatus to spatially separate light generated by the nonlinear optical element from the fundamental wave. For example, a cylindrical lens 13 for adjusting the size of the light beam is placed at least behind a wavelength conversion nonlinear optical crystal 12, and a light beam from the crystal 12 is passed through the lens near its edge, at a distance, from the central axis of the lens 13. The light beam is subject to a prism effect, and the generated beam B is separated from fundamental wave A as a result of the refractive index dispersion of the lens 13 and is transmitted.

7 Claims, 14 Drawing Sheets

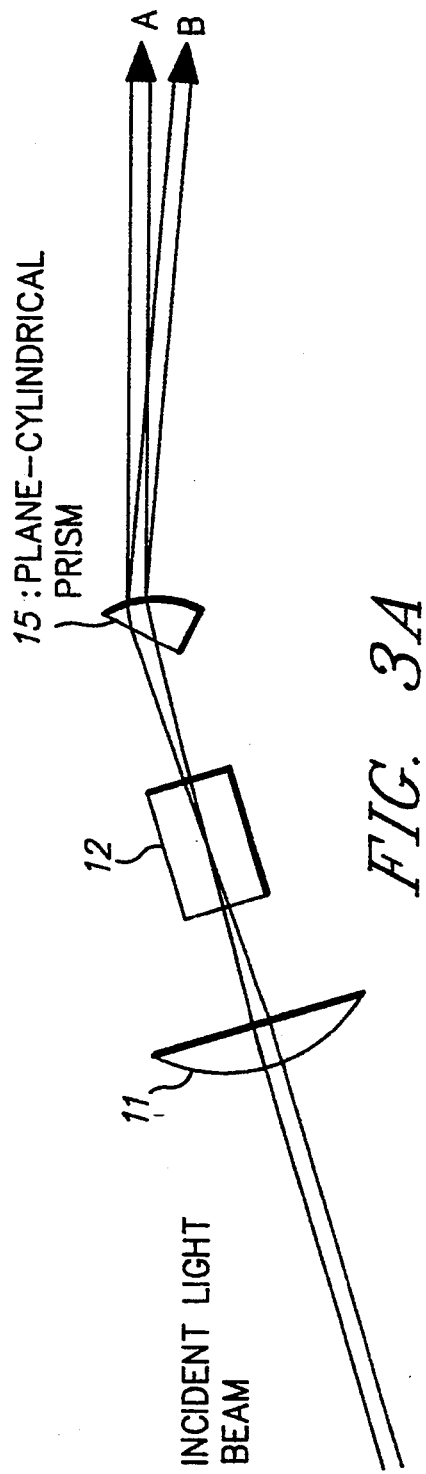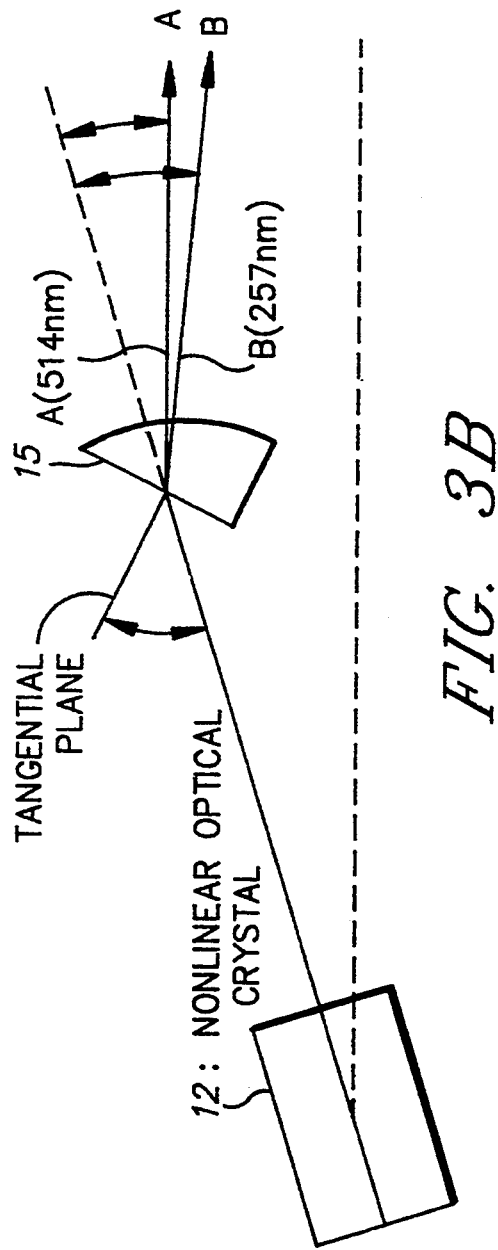

WAVELENGTH CONVERSION APPARATUS

TECHNICAL FIELD

The present invention relates to an apparatus using a nonlinear optical effect for converting the wavelength of an optical beam, and specifically, to an improvement in an optical system for separating an optical beam with a new wavelength generated by conversion from a fundamental beam.

BACKGROUND OF THE INVENTION

An intense coherent light such as a laser beam can be passed through a substance having a secondary nonlinear optical effect to generate a light wave with twice the frequency of the input light, or a light wave with a frequency that is the sum or difference of the frequencies of two input components if the input light includes a plurality of frequency components. These techniques are individually called second harmonic generation, sum frequency generation, and difference frequency generation. Although the direction of the generated light wave may sometimes differ from that of the input laser light, that is, the excitation light (or fundamental light wave), it is normally made to be the same as the direction of the excitation light in order to enhance the conversion efficiency by increasing the power of the generated light wave. It is therefore necessary to reseparate the generated light wave from the excitation light (fundamental wave) in order to use only the frequency of the generated light wave. For this purpose, as shown in FIG. 1, for example, proposals have been made to use a dichroic mirror 1 that transmits one frequency and reflects the other frequency (see FIG. 1), or a wavelength-selective element such as a prism 2 or a diffraction grating 3. Alternatively, a polarizing beam splitter 4 or the like has been used, taking advantage of the fact that the generated light wave differs in polarization from the fundamental wave. In FIG. 1, the numeral 5 designates a laser generation source, and numeral 6 denotes a wavelength conversion apparatus. To obtain maximum output power, it is necessary to reduce the power losses of the fundamental wave A and the generated light wave B to a minimum in these wavelength-selective elements 1 to 4.

Although a dichroic mirror 1 can generally reduce the power losses of both the fundamental wave A and the generated light wave B, it is sometimes difficult to fabricate a mirror that reduces power losses depending on the wavelength region. In order to separate two wavelengths, it is necessary that the mirror should have a transmittance as close to 100% as possible at one wavelength and a reflectivity as close to 100% as possible at the other wavelength. However, for example, for a blue 500 nm fundamental wave A and a generated light wave B with double that frequency (250 nm), it is rather difficult in practice to increase the reflectivity at 500 nm and at the same time to obtain a transmittance of 80% or more at 250 nm. In particular, although such a mirror is necessary for an intracavity frequency converter, only 80% or less of the generated power will be effectively obtained, because of the limitation of the mirror.

A prism 2 can substantially reduce the power loss of both the fundamental wave and the generated light wave. However, if such an optical system is to be incorporated in an apparatus for high-efficiency intracavity frequency conversion, the number of optical devices in the resonator will be increased by the number of prisms 2. One problem is that even a minute increase in the power loss due to the increase in the number of devices has a substantial impact on the prisms effect of increasing the power generated by the resonator.

Although separation is easier when a diffraction grating 3 is used, because the latter provides high-wavelength dispersion, it is of almost no use in intracavity frequency conversion in which even the slightest loss is a problem, since its reflectivity is not sufficiently high.

It would also be very difficult to fabricate a polarizing beam splitter 4 with a reduced loss; even if such a splitter was realized, it would be very expensive.

Therefore, in most prior art intracavity frequency conversion, dichroic mirrors have been used in place of other mirrors, to allow the resonator to eliminate the generated light wave. However, the specifications required for such dichroic mirrors are rather strict; the reflectivity of the fundamental wave must be as high as possible, the transmittance of the generated light wave must be as high as possible, and the mirrors must be able to sufficiently withstand the high power in the resonator.

On the other hand, the inventors have proposed an intracavity frequency conversion method in which the cross-section of the beam focus in the wavelength conversion crystal is elliptical (Japanese Patent Application No. 3-159530/1991). This invention is also disclosed by Yoichi Taira in "High-Power Continuous-Wave Ultraviolet Generation by Frequency Doubling of an Argon Laser", *Jpn. J. Appl. Phys.*, Vol. 31, 1992, pp. L682-L684.

In the proposed method, it is very important to design an optical system that causes a minimum loss of the fundamental wave and that can produce a light wave of a newly-generated wavelength most efficiently. To achieve this, an optical system using dichroic mirrors is normally used. However, when the generated light wave is in the ultraviolet region, where the proposed method can be utilized most effectively, it is not always easy to obtain an appropriate mirror. Currently, a mirror for transmitting ultraviolet or totally reflecting green light suffers a heavy power loss due to scattering because of the increased number of layers in the dielectric coating, and the ultraviolet transmittance is about 70% at most. Furthermore, the generated ultraviolet light may degrade optical materials when applied to them. A simple way of avoiding this by separating ultraviolet light from its fundamental wave is thus required.

Therefore, an object of the present invention is to provide a wavelength conversion apparatus that can separate an optical beam generated by a nonlinear optical element from a fundamental beam by using a simple mechanism.

Another object of the present invention is to reduce the power loss associated with the wavelength separation and improve the performance of the wavelength conversion apparatus.

The present invention can be applied not only to a wavelength conversion apparatus using a resonator, but also to a wavelength conversion apparatus that has no resonator.

SUMMARY OF THE INVENTION to accomplish the above objects, in a first aspect of the present invention, there is provided a wavelength conversion apparatus using a nonlinear optical element, wherein typically an optical focusing lens has a wavelength selection function. Specifically; the apparatus comprises a nonlinear optical element for converting the wavelength of light by generating a light wave whose wavelength is different from that of an incident fundamental wave, and a lens for focusing the beams, including the generated light wave and the fundamental wave, output from the nonlinear optical element, the beams passing through the lens not along its central axis, so that the lens acts as a prism. Furthermore, the tangential plane of the input surface of the beams at their point of input is substantially antiparallel to the tangential plane of the output surface of the beams at their point of output.

In a second aspect of the present invention, there is also provided a wavelength conversion apparatus comprising a nonlinear optical element for converting the wavelength of light by generating a light wave with a wavelength different from an incident fundamental wave, and an optical element disposed for receiving the beams output from the nonlinear optical element, the optical element having at least two transmitting surfaces, at least one pair of the transmitting surfaces being substantially antiparallel, and at least one transmitting surface of the pair having a lens effect.

In a third aspect of the present invention, there is provided a wavelength conversion apparatus comprising a nonlinear optical element with a wavelength selection function. Specifically, it comprises a nonlinear optical element for converting the wavelength of light by generating a light wave with a wavelength different from that of an incident fundamental wave, the optical path inside the nonlinear optical element of the newly-generated light wave and the fundamental wave being substantially nonperpendicular to the surface from which those beams are output.

BRIEF DESCRIPTION OF THE DRAWINGS

FIG. 3A and 3B are schematic diagram showing the basic structure (A) and an enlargement (B) of part of a wavelength conversion apparatus according to the present invention that uses a plane-convex prism.

DESCRIPTION OF THE PREFERRED EMBODIMENT

The principle and operation of the present invention will now be described with reference to the accompanying drawings.

A typical example of the present invention is a wavelength conversion apparatus that incorporates a lens having a prism effect in an optical focusing system for focusing light wave on a nonlinear optical element. This lens is employed for the purpose of condensing the fundamental wave incident onto the nonlinear optical element, or to collimate the output light.

In the first aspect of the present invention, a prism for wavelength separation is integrated with a beam-adjusting lens in the optical focusing system in order to reduce the number of end faces causing reflection loss, thereby achieving efficient wavelength conversion. When a cylindrical lens is required, simple wavelength conversion is achieved by placing the cylindrical lens off-axis so that the optical beam passes through the lens off-center, thereby simultaneously ensuring optical focusing by the cylindrical lens and a prism effect as a result of the off-axis placement of the lens, without specific polishing.

Figure 1A:
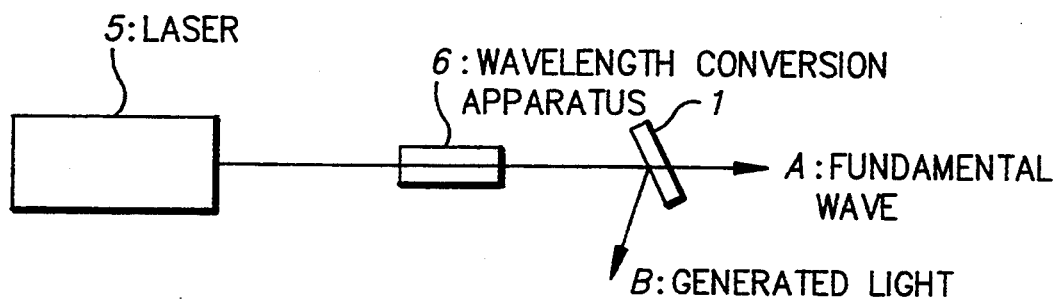
FIG. 1A-1D are schematic diagram showing prior art wavelength separation mechanisms for separating a frequency-converted optical beam from a fundamental wave.
Figure 1B:
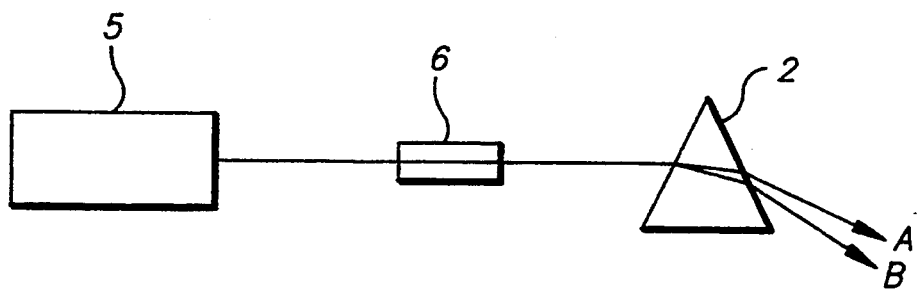
Figure 1C:
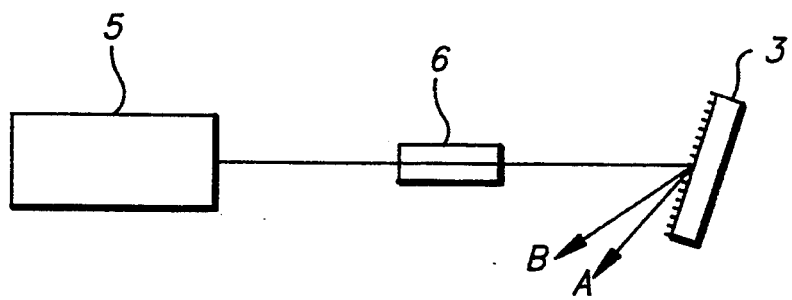
Figure 1D:
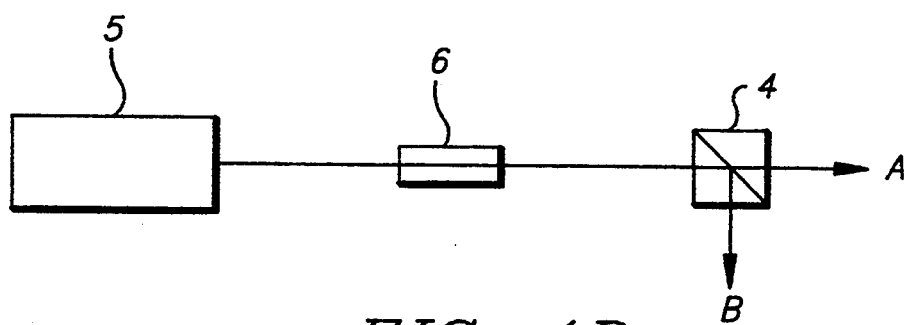
Figure 2A:
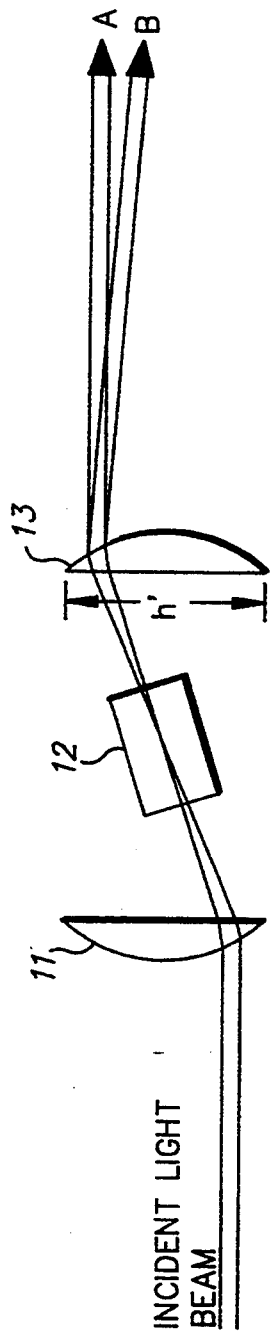
FIG. 2A and 2B are schematic diagram showing the basic structure (A) and an enlargement (B) of part of a wavelength conversion apparatus according to the present invention that uses cylindrical lenses in the off-axis state.
Figure 2B:
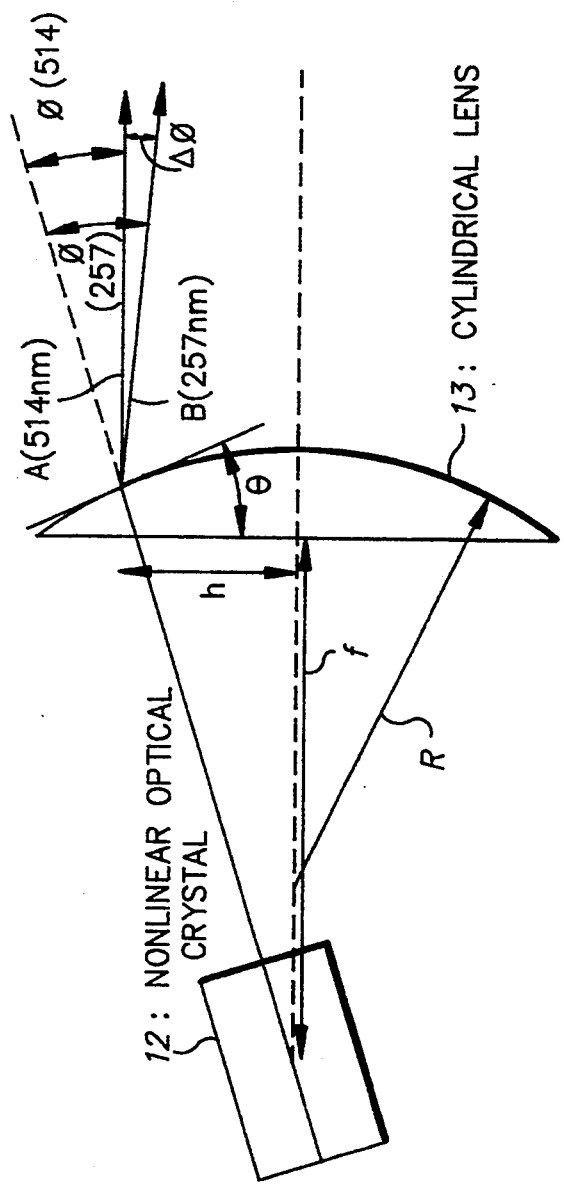

FIG. 2 is a schematic diagram showing the off-axis placement of the cylindrical lenses for adjusting the optical beam size so that the optical beam passes through each lens near its edge. In this figure, numeral 12 indicates a nonlinear optical crystal, and the numerals 11 and 13 indicate cylindrical lenses. When the cylindrical lenses are placed off-axis, the spatial separation under actual conditions is estimated as follows. In FIG. 2(B), the curvature radius R of the cylindrical surface of a fused silica cylindrical plane-convex lens whose focal length is 70 mm at 514 nm is given by the formula $R = (n - 1) f$, where n is the refractive index of fused silica.

Noticing that n=1.460 (514 nm) and n=1.504 (257 nm), then R=(1.460−1)×70 (mm)=32 min. When the height h' of the lens 13 is 30 mm, and the optical beam passes through the location h, 12 mm off the center of the lens, $\theta \approx$ arcsin (12/32) (=0.384). The angle of deflection $\phi$ between the two wavelengths 514 nm and 257 nm is approximately represented as $\phi=(n-1)\theta$. Thus, the angle of separation $\Delta\phi$ between the two wavelengths is the difference in their refractive indices, which is expressed by $\Delta\phi=\Delta n\phi$, where $\Delta n$ is the difference between the refractive indices, at the two wavelengths; here, since $\Delta\phi=0.044\times0.384=0.017$ (radians), the two beam centers are separated by 1 mm at 60 mm from the lens 13. Therefore, two beams at about 1 mm in diameter are sufficiently separated at about 100 mm from the cylindrical lens 13. This eliminates the need for a wavelength separation element such as a dichroic mirror or the like, thereby greatly reducing the energy loss.

FIG. 3 shows a second embodiment of the present invention in which a cylindrical lens and a prism are integrated. In FIG. 2, the numeral 15 indicates a prism-like element (a plane-cylindrical prism) having a pair of optical transmitting surfaces that are substantially anti-parallel, one being polished to a curved (spherical or cylindrical) surface and the other being flat. When the incidence on the flat plane satisfies the Brewster angle condition and the prism is formed of quartz glass, light beams with wavelengths of 514.5 nm and 257 nm have a separation angle of $\Delta\phi=0.037$ (radian) according to a calculation similar to that shown in FIG. 2, and the two light beams can be separated. The prism-like element 15 is of course obtained by cutting a portion near the edge of the cylindrical plane-convex lens 13 shown in FIG. 2. The prism-like element 15 can be one that has a pair of optical transmitting surfaces, one being a flat surface and the other being a convex surface (spherical or cylindrical). Therefore, it can also be called a plane-convex prism.

Figure 4:
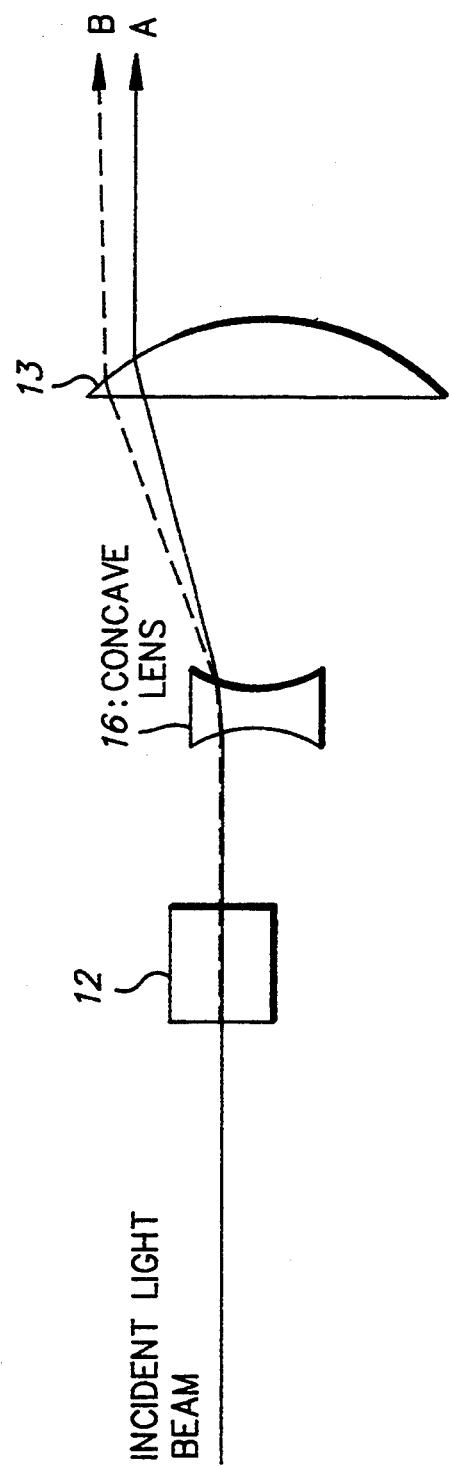
FIG. 4 is a schematic diagram showing the basic structure of a wavelength conversion apparatus according to the present invention that uses a concave lens in the off-axis state.

As described above, a lens used for separating light beams of different wavelengths by means of refractive index dispersion is not limited to the above convex lens 13, but a concave lens 16 as shown in FIG. 4 can alternatively be used. When the concave lens 16 and the cylindrical plane-convex lens 13 are placed off-axis so that the optical path of a light beam output from a non-linear optical crystal 12 passes through the lenses off-center, separation of the light beams can be increased even further.

Figure 5:
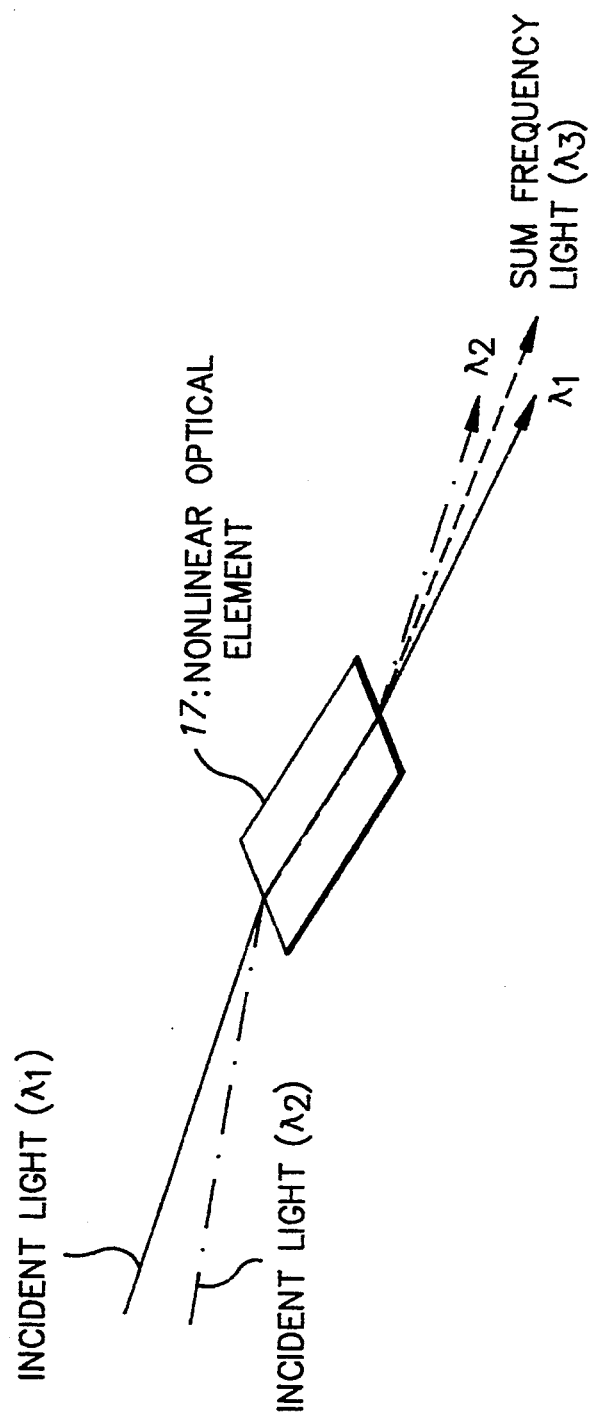
FIG. 5 is a schematic diagram showing the basic structure of a wavelength conversion apparatus according to the present invention for separating a generated beam from a fundamental beam using refractive index dispersion of a nonlinear optical element.

The third embodiment of the present invention uses refractive index dispersion of a nonlinear optical element to separate light beams of different wavelengths. For this purpose, as shown in FIG. 5, the optical path in a nonlinear optical element 17 is substantially nonperpendicular to the output surface of the nonlinear optical element 17, thereby providing the nonlinear optical element itself with a prism effect. This arrangement can effectively separate optical beams when a type-II second harmonic is generated, or when the sum or difference frequency is generated.

As shown in FIG. 5, when a beta-barium borate ($\beta$-BaB$_2$O$_4$) (hereinafter referred to as BBO) crystal, for example, is used as the nonlinear optical element and two light beams with wavelengths of 1.064 $\mu$m and 0.532 $\mu$m are applied as incident light waves $\lambda_1$ and $\lambda_2$ to obtain light $\lambda_3$ of 0.355 $\mu$m wavelength (the sum frequency) as a conversion output, the refractive indices (ordinary light) of BBO for the two incident light beams (fundamental light beams) are 1.65510 and 1.67493, respectively, whereas the refractive index for the sum frequency beam (extraordinary light) in the phase-matching condition is 1.66832. When the crystal is polished to make the two end surfaces parallel and is placed so that the fundamental light beams fall on one of the end surfaces in the Brewster angle condition, the incident angles (which are the same as the exit angles) of the two fundamental light beams on the crystal are 58.45 degrees and 59.6 degrees, respectively. In this case, since the exit angle of the sum frequency beam is 59.2 degrees, the sum frequency beam has angles of 0.75 degrees and 0.4 degrees, respectively, relative to the two fundamental light beams. When the incident beam is 1 mm in diameter, the centers of two beams having an angle of 0.4 degrees are separated by 1 mm at a distance of 150 mm, and thus sufficiently separable from one another. Although for the optimization of the incident angles of the input beams $\lambda_1$ and $\lambda_2$ it is necessary to take account of (1) the magnitude of wavelength separation, and (2) the minimization of optical power loss, the Brewster angle is optimal from the viewpoint of the minimization of the optical power loss. Thus, only the Brewster angle condition is considered in this case.

The crystal 17 may be a rectangular parallelepiped, but a rhombohedral solid as shown in FIG. 5 can reduce the crystal size.

Figure 6:
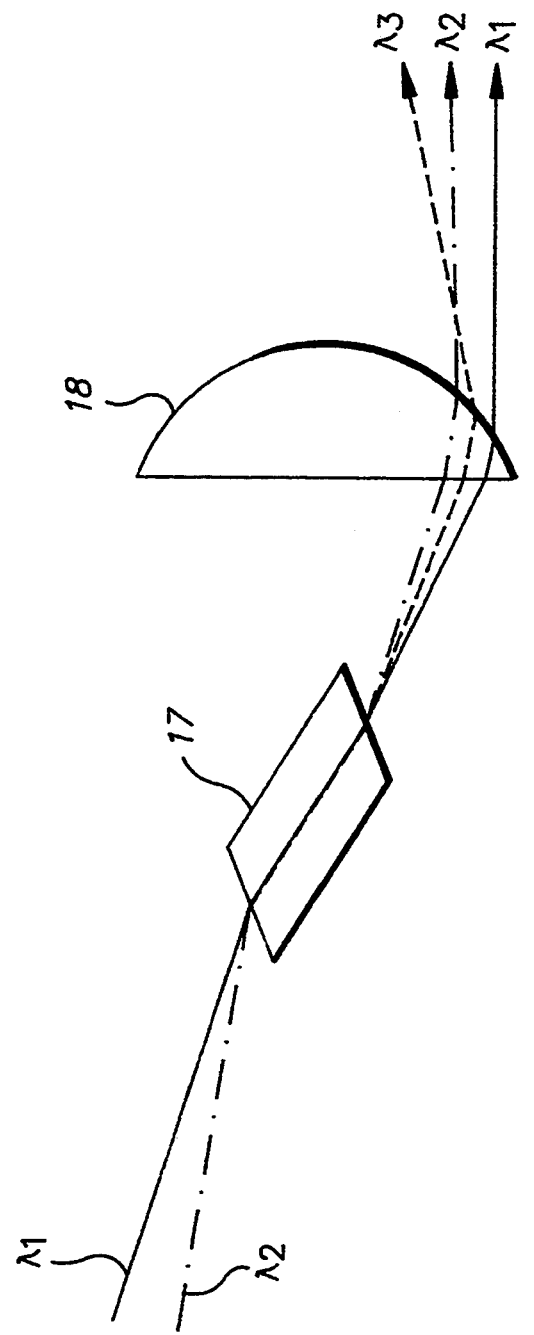
FIG. 6 is a schematic diagram showing the basic structure of a wavelength conversion apparatus according to the present invention for separating a generated beam from a fundamental beam by combining a prism effect achieved by refractive index dispersion of the nonlinear optical element shown in FIG. 5 with a prism effect achieved by refractive index dispersion of the lens shown in FIG. 2.

Alternatively, the angle between the beams can be even further increased by placing another lens 18 in an off-axis state on the output side of the nonlinear optical element 17 as shown in FIG. 6.

Preferred embodiments of the present invention will now be described with reference to the drawings.

Figure 7:
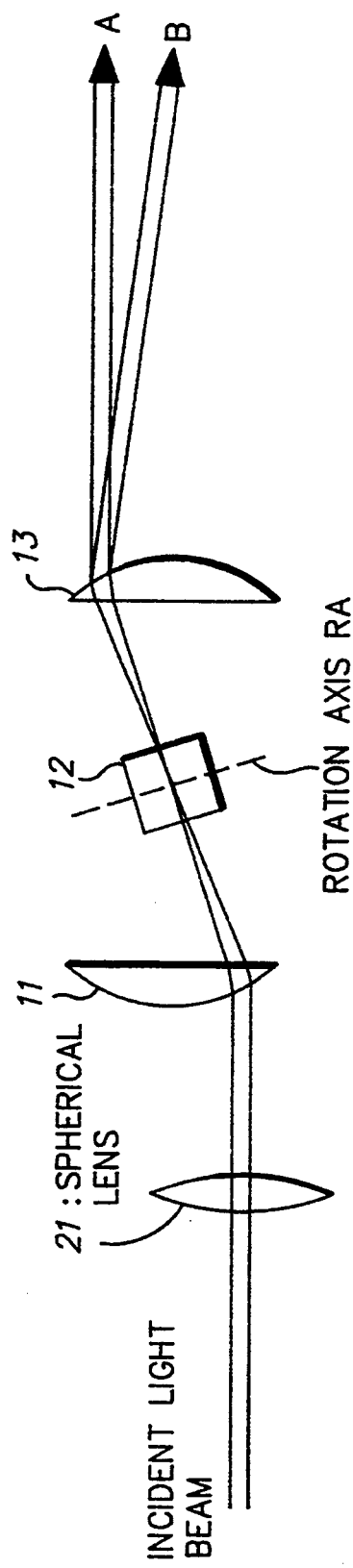
FIG. 7 is a schematic diagram showing an embodiment of the single-path wavelength conversion apparatus according to the present invention.

FIG. 7 shows an apparatus according to a preferred embodiment of the present invention, which uses the basic arrangement of the cylindrical lens in FIG. 2 in a single-path wavelength conversion apparatus. The incident beam passes through a focusing spherical lens 21 for adjusting the beam size and a first-stage cylindrical lens 11, and is directed onto a nonlinear optical crystal 12. The cylindrical lens 11 can provide the beam convergence with the directional difference required for focusing the incident light beam under optimal conditions. Furthermore, since the beam focused by the cylindrical lens has an elliptical cross-section whose cross-sectional area is greater than that of a beam output by a focusing optical system employing a spherical lens that focuses light to a single point, the optical energy is dispersed, thereby preventing optical damage to the crystal. This is advantageous when the wavelength conversion element is placed within the optical resonator and a continuous output laser beam is focused by a focusing optical system in order to enhance the conversion efficiency. This is because when a spherical lens is used in the focusing system to focus an incident laser beam from a continuous output laser onto the nonlinear optical crystal placed in the optical resonator, the light intensity in the nonlinear optical crystal may exceed an intensity that induces optical damage. It is preferable to use the above-described BBO ($\beta$-barium borate crystal) as the nonlinear optical crystal, 12, since it is a uniaxial crystal having some advantageous properties for a wavelength conversion element: it has a high nonlinear sensitivity up to the ultraviolet region, and a wide transparent region; it enables phase matching over a broad wavelength range; it is chemically stable; and it has a high optical damage strength. In practice, the crystal 12 is rotated about a rotation axis RA to adjust the phase-matching condition.

When the incident beam is applied, a beam B (conversion output beam) with a new frequency and different in wavelength from the incident fundamental beam A (the light wave before conversion) is generated in the nonlinear optical crystal 12. The frequency-converted light beam is typically a second harmonic created by a process called SHG (second harmonic generation). The two optical beams A and B pass through off-axis and near the edge a post-stage cylindrical lens 13 off-axis and near the edge, and are deflected by the prism effect. Thus, the generated beam B is separated at a spatially different place by the refractive index dispersion of the lens 13; that is, it is transmitted in a direction different from that of the fundamental beam A.

Figure 8:
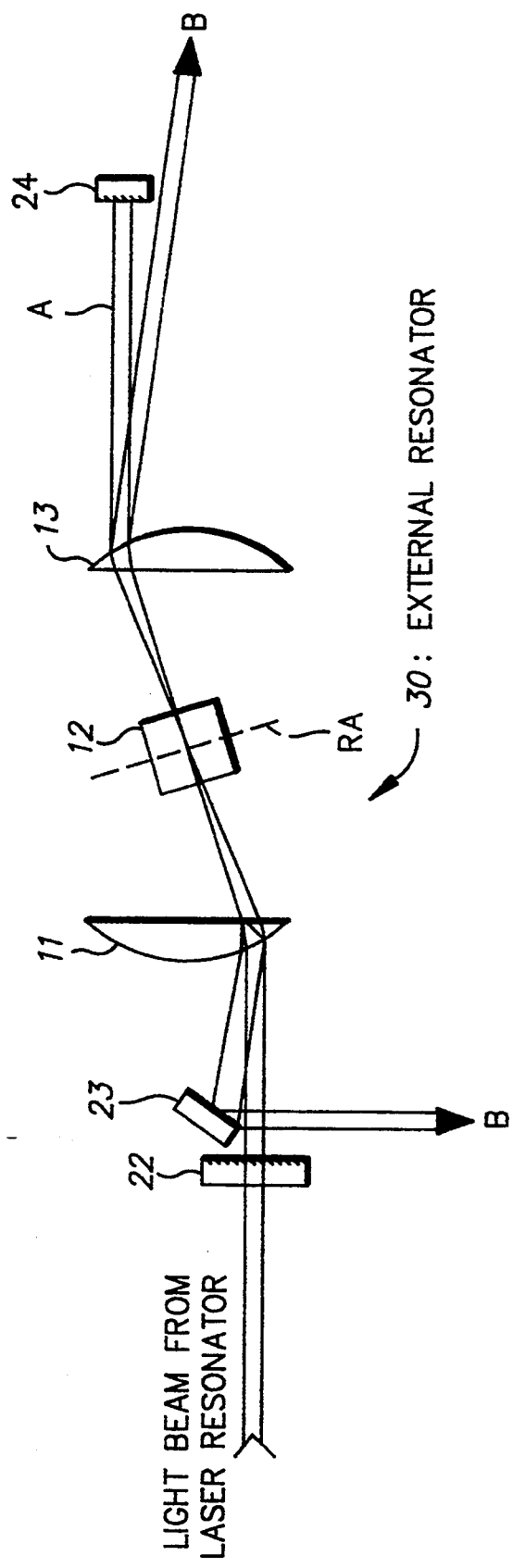
FIG. 8 is a schematic diagram showing a first embodiment of the wavelength conversion apparatus according to the present invention incorporated in an external resonator.

FIG. 8 shows an embodiment wherein the arrangement shown in FIG. 2 is applied to an external resonator 30 outside the laser resonator. The elements 11 to 13 are symmetrically placed as shown in FIG. 8 so that the optical beam passes through the cylindrical lenses 11 and 13 off-axis and near the edge. Total reflecting mirrors 23 and 24 having a high reflectivity for deep ultraviolet beams of a second harmonic are placed at predetermined light path positions outside the individual cylindrical lenses 11 and 13 disposed on both sides of the nonlinear optical crystal 12. Furthermore, a half-mirror 22 that passes the input optical beam from the laser source and reflects the returned light in the reverse direction is placed outside the input side of the totally reflecting mirror 23. The external resonator 30 and the laser resonator (not shown) can be regarded as a single coherent light generator.

The optical beam from the laser source passes through the mirror 22, the lens 11, the crystal 12, and the lens 13. As described above, the fundamental beam A and the generated beam B (deep ultraviolet light of a second harmonic) are separated when the beams pass through the cylindrical lens 13 on the output side of the crystal, and the generated beam B is outputted to the outside. The fundamental beam A of the input beam that is not frequency converted is reflected by a totally reflecting mirror 24 placed in the transmission path of the fundamental beam A back to the cylindrical lens 13, and passes again through the nonlinear optical crystal 12 to generate a new beam B. These beams A and B pass again through the cylindrical lens 11 on the input side of the crystal, near its edge, to be separated, and the generated beam B is reflected by the totally reflecting mirror 23 and outputted to the outside. The fundamental beam A is reflected by the half-mirror 22 back to the cylindrical lens 11, where it is frequency converted again.

Figure 9:
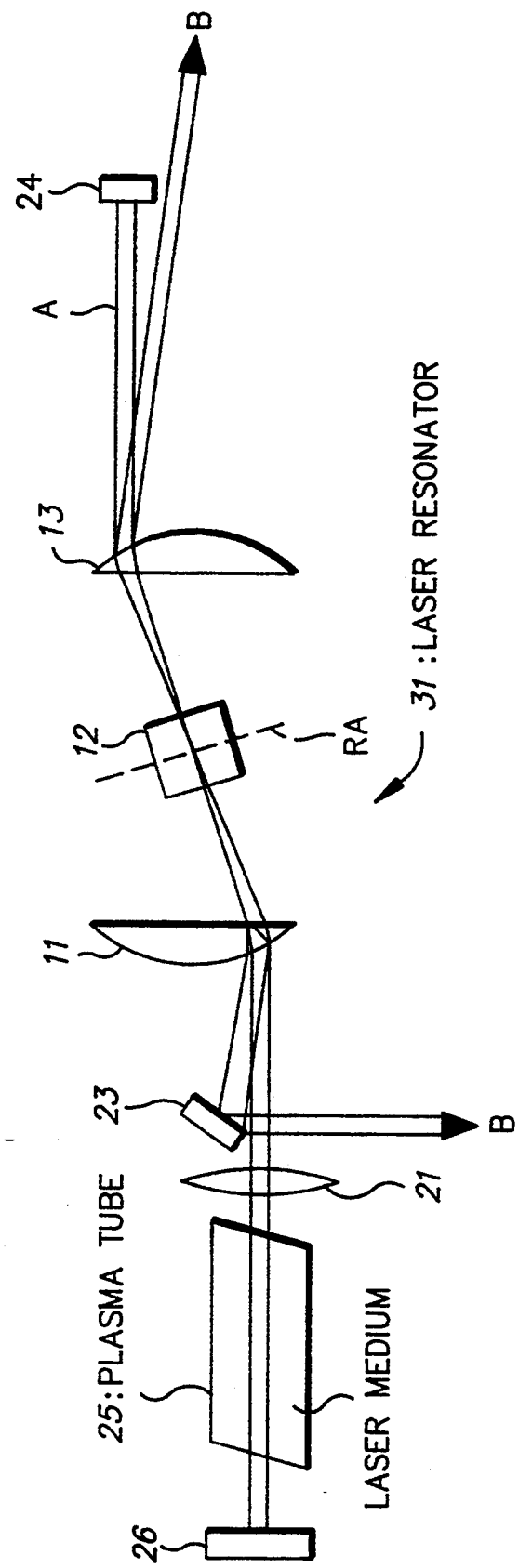
FIG. 9 is a schematic diagram showing an embodiment of a coherent light generation apparatus in which the present invention is applied to a laser resonator.

FIG. 9 shows an embodiment of a coherent light-generation apparatus that incorporates the wavelength conversion mechanism shown in FIG. 2 in a laser resonator 31. In this figure, the numeral 25 indicates a plasma tube including a laser medium such as a continuous-wave (CW) argon laser. The argon laser can be one that generates a coherent continuous-wave (CW) laser beam having a wavelength of $\lambda_1$ (e.g., 514.5 nm for the fundamental wave) in the visible light region with an output of 1 W. A krypton laser is a good alternative in the plasma tube 25. The numeral 26 denotes a flat mirror having high reflectivity for light with a wavelength of $\lambda_1$ and for deep ultraviolet light (wavelength $\lambda_2=257$ nm) of a second harmonic with wavelength $\lambda_1$. Comparison of this embodiment with the above-described arrangement shown in FIG. 8n reveals that, although the focusing spherical lens 21 is placed at the position of the half-mirror 22 in FIG. 8, the positions of the elements 23, 11, 12, 13, and 24 remain unchanged.

Figure 10:
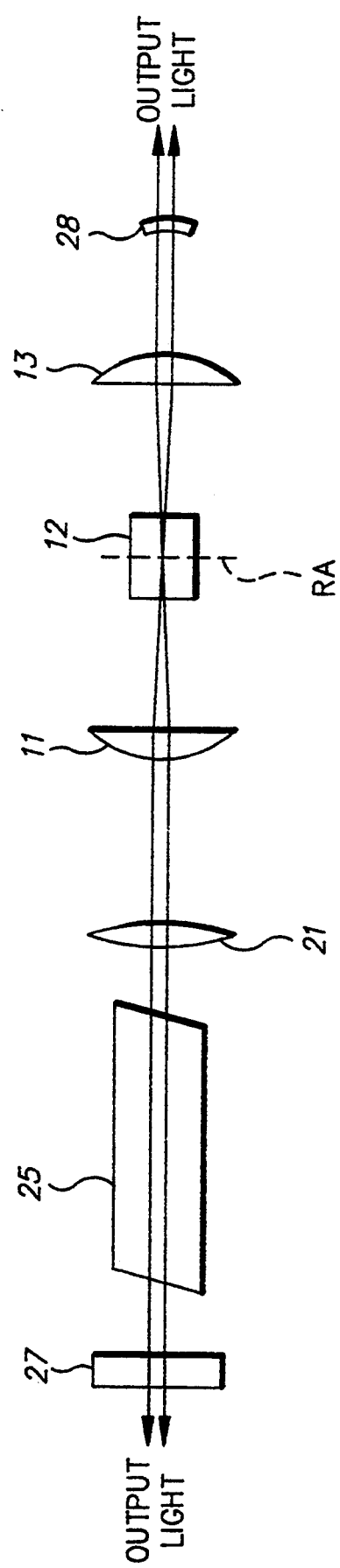
FIG. 10 is a schematic diagram showing a prior art coherent light generation apparatus.

The apparatus shown in FIG. 10 is a prior art coherent light generator, which is shown for comparison with the embodiments according to the present invention. In this figure, the numeral 27 indicates a dichroic flat mirror that has a high reflectivity for light of wavelength $\lambda_1$ generated by the argon plasma tube 25, and a high transmittance to a second harmonic of wavelength $\lambda_2$. The numeral 28 indicates a dichroic concave mirror that similarly has a high reflectivity for light of wavelength $\lambda_1$, but a high transmittance for light of wavelength $\lambda_2$. The flat mirror 27 is placed behind the plasma tube 25 and the concave mirror 28 is placed in front of the cylindrical lens 13, so that the light beam passes through the centers of the cylindrical lenses 11 and 13. Therefore, in the prior art, the light beams A and B are not separated by the cylindrical lenses 11 and 13, but only the generated beam B is separated by the flat mirror 27 and the concave mirror 28 and outputted to the outside.

The structure of the apparatus shown in FIG. 9 is the same as in the prior art except that a mirror 23 for reflecting the UV light B to one side is provided, and the mirrors 24 and 28 are not dichroic mirrors. Thus, it does not require the dichroic mirrors 27 and 28, whose specifications are demanding. Furthermore, in the embodiment according to the present invention shown in FIG. 9, since UV light is not applied to the optical elements forming the laser resonator 31 except or the two cylindrical lenses 11 and 13 and the crystal 12, degradation due to UV light is prevented. Moreover, an embodiment of the present invention that requires no special element (such as a prism) for wavelength separation costs little and causes no substantial power loss.

Figure 11:
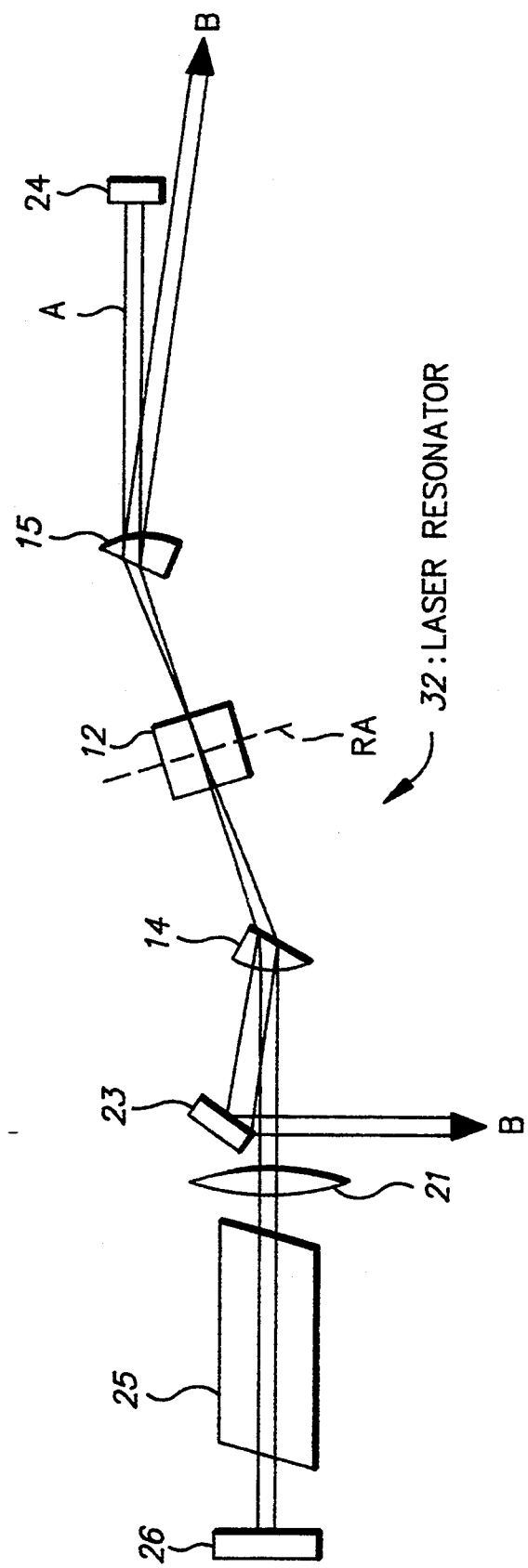
FIG. 11 is a schematic diagram showing another embodiment of a coherent light generation apparatus in which the present invention is applied to a laser resonator.

FIG. 11 shows an embodiment of a coherent light generator that incorporates into a laser resonator 32 a plane-cylindrical prism having the basic structure shown in FIG. 3. The arrangement is identical to the embodiment shown in FIG. 9 except for a pair of plane-cylindrical prisms 14 and 15 disposed in place of the cylindrical lenses on both sides of the nonlinear optical crystal 12, and has the same function as that described in referring to FIG. 9. This embodiment can be considered as a modification of wherein portions of the cylindrical lenses 11 and 13 through which the beam never passes are eliminated and replaced with prism-like elements 14 and 15 that also act as focusing lenses.

Figure 12:
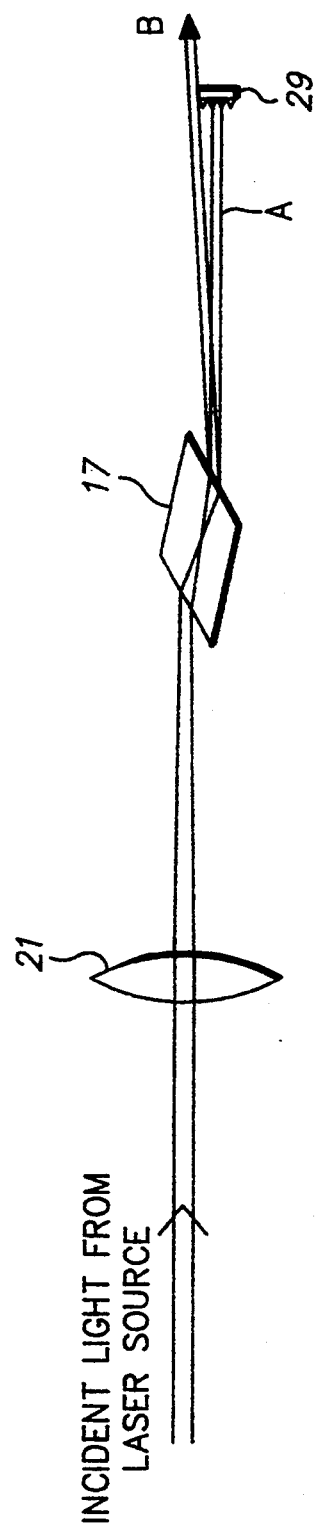
FIG. 12 is a schematic diagram showing another embodiment of the single-path wavelength conversion apparatus according to the present invention.

FIG. 12 shows an embodiment that uses the basic structure shown in FIG. 5 as a single-path wavelength conversion apparatus. A light beam focused through a spherical lens 21 is incident on a type-II second harmonic generating nonlinear optical element 17 in the Brewster angle condition so that a new frequency-generated beam B is generated in the element 17. The generated beam B and the unconverted fundamental wave A of the incident beam are subjected to the prism effect on the outputting surface of the nonlinear optical element 17 and thus individually led/guided in different directions. The generated beam B, which is a second harmonic, is outputted to the outside, whereas the fundamental beam A is absorbed by a blocking member 29.

Figure 13:
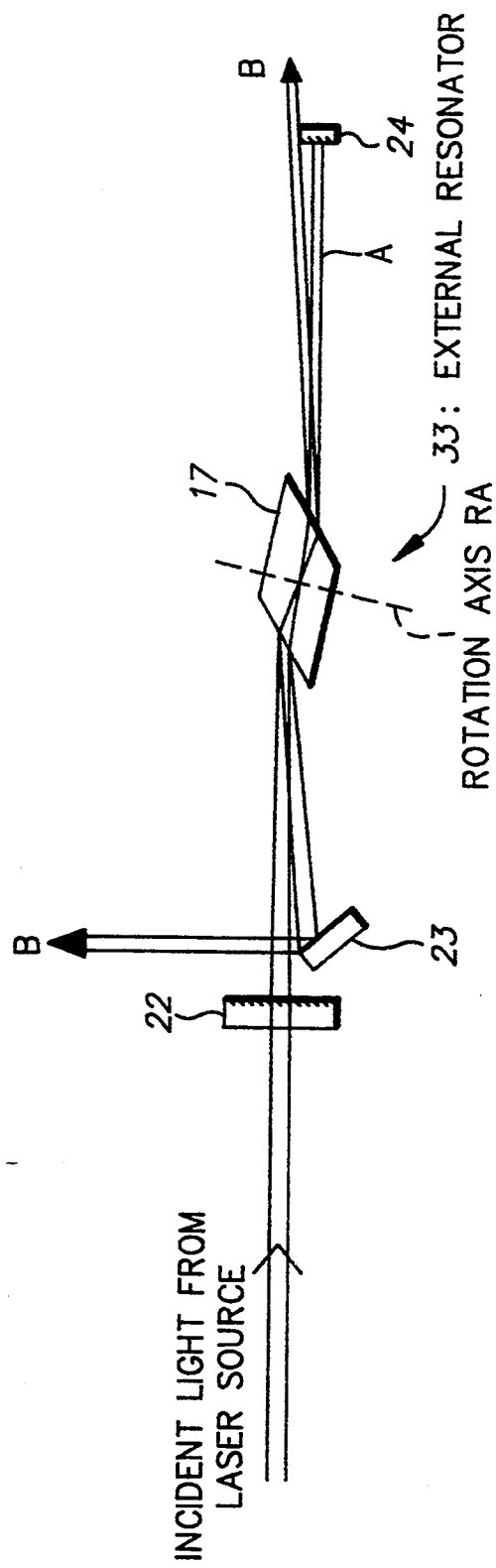
FIG. 13 is a schematic diagram showing a second embodiment of the wavelength conversion apparatus according to the present invention incorporated in an external resonator.

FIG. 13 shows an embodiment of the present invention that incorporates into an external resonator 33 a wavelength conversion mechanism similar to that shown in FIG. 12. In the structure of this embodiment, the cylindrical lenses 11 and 13 and the nonlinear optical crystal 12 of the arrangement as shown in FIG. 8 are replaced with the nonlinear optical element 17, where the incident and output beams are tilted from the incident surface normal as shown in FIG. 5 or FIG. 12, and the performance as a whole is almost the same as that of the arrangement shown in FIG. 8. Specifically, the incident beam from the laser source passes through the half-mirror 22 and. Falls on the nonlinear optical element 17. The fundamental beam A and the beam B generated by the optical element 17 are individually led/guided in different directions at the rear-end surface of the optical element 17. The generated beam (UV light) is outputted to the outside, whereas the fundamental beam A is reflected by the reflecting mirror 24 and returned, and falls again on the nonlinear optical element 17 to generate a new beam B. This new beam B separated on the input surface of the nonlinear optical element 17 is reflected by the reflecting mirror 23 and transmitted sideways to be outputted to the outside. On the other hand, the fundamental beam A transmitted in the reverse direction toward the laser source is reflected by the half-mirror 22, and is returned to the nonlinear optical element 17, where it undergoes wavelength conversion again.

Figure 14:
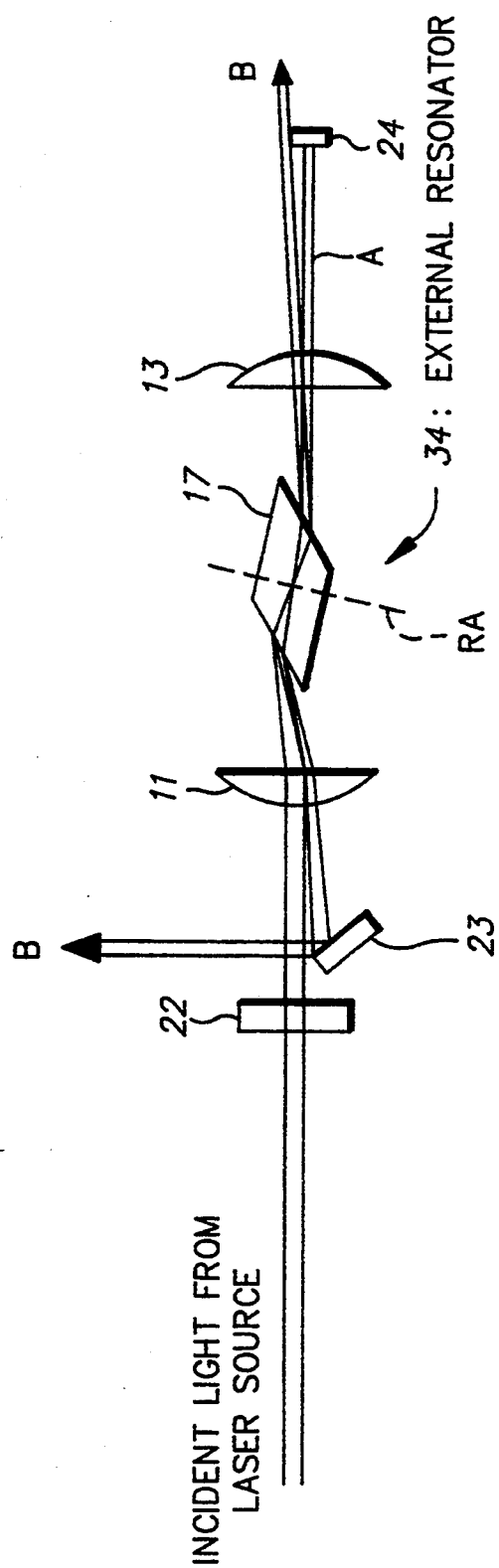
FIG. 14 is a schematic diagram showing a third embodiment of the wavelength conversion apparatus according to the present invention incorporated in an external resonator.

FIG. 14 shows an embodiment of an external resonator wavelength conversion apparatus that incorporates the nonlinear optical element 17 into a lens-combined external resonator 34 to achieve wavelength separation. The arrangement of this embodiment is based on that of FIG. 13, combined with the cylindrical lenses 11 and 13 inserted on both sides of the nonlinear optical element 17, where the incident and output beam is tilted from the incident surface normal. This embodiment provides the same performance as the arrangement shown in FIG. 13.

As described above, these embodiments utilize the nonlinear optical element or the lens elements to achieve spatial separation of the generated beam from the fundamental beam. Therefore, the embodiments can eliminate the need for wavelength separation elements such as dichroic mirrors, prisms, or diffraction gratings for separating the generated beam from the fundamental beam, thereby decreasing the cost of the apparatus and greatly reducing the power loss associated with wavelength selection.

A typical example in which the wavelength conversion apparatus according to the present invention is effective is wavelength conversion of continuous weak light using an angle phase matching wavelength conversion element. The example includes generation of the second harmonic by an argon laser. This second harmonic is in the deep ultraviolet region and is thus considered to have applications in photolithography and other optical process. It can also be applied to wavelength conversion lasers ranging to a visible light region or infrared region.

The present invention enables light generated by a nonlinear optical element to be separated from a fundamental wave by means of a simple mechanism.

I claim:

1. An apparatus for wavelength conversion of an incident light beam from a light source, the light beam having a fundamental wavelength, the apparatus comprising:
   a nonlinear optical element for generating from the incident beam an output light beam with a wavelength different from the fundamental wavelength of the incident beam, the nonlinear optical element having an entrance for the incident beam and an exit for both the incident beam and the generated output beam;
   a first lens located between the light source and the entrance to the nonlinear optical element and having its central axis displaced from the incident beam; and
   a second lens onto which the generated output beam and the incident beam are directed from the exit of the nonlinear optical element, the second lens having its central axis displaced from the incident beam and generated output beam exiting the nonlinear optical element; whereby the incident beam and the generated output beam exiting the nonlinear optical element are spatially separated.

2. An apparatus for wavelength conversion of an incident light beam from a light source, the light beam having a fundamental wavelength, the apparatus comprising:
   a nonlinear optical element for generating from the incident beam an output light beam with a wavelength different from the fundamental wavelength of the incident beam, the nonlinear optical element having an entrance for the incident beam and an exit for both the incident beam and the generated output beam; and
   a plane-convex optical means onto which the incident beam and generated output beam exiting the nonlinear optical element are directed, said optical means having two nonparallel transmitting surfaces, one of the transmitting surfaces being substantially flat and the other transmitting surface being generally convex to provide a lens effect; whereby the incident beam and the generated output beam exiting the nonlinear optical element are spatially separated.

3. An apparatus for wavelength conversion of at least two incident light waves of different wavelengths from a light source, the apparatus including a nonlinear optical element for generating from the incident waves an output light beam with a wavelength different from the wavelengths of the incident light waves, the nonlinear optical element having a flat entrance surface for the incident light waves and a flat exit surface for both the incident light waves and the generated output beam, the entrance and exit surfaces being generally parallel to one another, the optical path inside said nonlinear optical element of the generated output beam and the incident light waves being substantially nonperpendicular to said exit surface, and either the flat entrance surface or flat exit surface being oriented at the Brewster angle relative to the incident light waves; whereby the incident light waves and the generated output beam exiting the nonlinear optical element are spatially separated.

4. The apparatus of claim 1 wherein said first lens is incorporated in an optical focusing system for focusing said incident beam onto said nonlinear optical element.

5. An apparatus for generating coherent light as claimed in one of claims 1–3 further comprising an optical resonator and a laser medium placed in said optical resonator, wherein said wavelength conversion apparatus is incorporated within said optical resonator.

6. An apparatus for generating coherent light as claimed in one of claims 1–3 further, comprising an optical resonator and a laser medium placed in said optical resonator, and wherein said wavelength conversion apparatus is located outside said optical resonator.

7. The apparatus claimed in one of claims 1–3 wherein said nonlinear optical element is formed of a beta-barium borate crystal.

* * * * *